United States Patent [19]

Yamaguchi

[11] Patent Number: 5,776,818

[45] Date of Patent: Jul. 7, 1998

[54] METHOD OF FABRICATING SILICON-ON-INSULATOR PRESSURE DETECTING DEVICE

[75] Inventor: Yasuo Yamaguchi, Tokyo, Japan

[73] Assignee: Mitsubishi Denki Kabushiki Kaisha, Tokyo, Japan

[21] Appl. No.: 803,643

[22] Filed: Feb. 21, 1997

Related U.S. Application Data

[62] Division of Ser. No. 645,074, May 13, 1996, Pat. No. 5,677,548.

[30] Foreign Application Priority Data

Dec. 8, 1995 [JP] Japan ................. 7-320104

[51] Int. Cl.$^6$ ................................. H01L 21/20
[52] U.S. Cl. ................................. 438/479; 117/44
[58] Field of Search ................. 117/43, 44; 438/166, 438/479, 486, 487, 491

[56] References Cited

U.S. PATENT DOCUMENTS

| | | | |
|---|---|---|---|
| 4,053,207 | 10/1977 | Keve et al. | 350/150 |
| 4,545,823 | 10/1985 | Drowley | 438/481 |
| 4,585,493 | 4/1986 | Anthony | 117/42 |
| 4,822,752 | 4/1989 | Sugahara et al. | 437/174 |
| 5,471,086 | 11/1995 | Ipposhi et al. | 257/417 |
| 5,525,434 | 6/1996 | Nashimoto | 428/692 |

*Primary Examiner*—John Niebling
*Assistant Examiner*—Brendan Mee
*Attorney, Agent, or Firm*—Leydig, Voit & Mayer, Ltd.

[57] ABSTRACT

A method of fabricating a silicon structure including forming an insulating layer having an opening on single crystal semiconductor substrate; forming a polycrystalline semiconductor layer on the insulating layer and within the opening in the insulating lating layer; forming an anti-reflective film at spaced apart positions on the polycrystalline semiconductor layer spaced from the opening in the insulating layer by a substantially uniform distance; melting the polycrystalline semiconductor layer by laser irradiation and recrystallizing the polycrystalline semi-conductor layer into a single crystal layer including a quasi-grain boundary; and selectively implanting dopant impurities into the portion of the single crystal layer including the quasi-grain boundary.

2 Claims, 14 Drawing Sheets

5,776,818

1

METHOD OF FABRICATING SILICON-ON-INSULATOR PRESSURE DETECTING DEVICE

This disclosure is a division of Pat. application Ser. No. 08/645,074, filed May 13, 1996 now U.S. Pat. No. 5,677,548.

BACKGROUND OF THE INVENTION

The present invention relates to an SOI (Silicon On Insulator) structure in which a single crystal is grown transversely from a seed crystal on an insulating film, its fabricating method, and a semiconductor pressure-sensing device using the SOI structure.

Conventionally, there has been an SOI structure formed by growing a single crystal transversely on an insulating film, its fabricating structure, and a semiconductor pressure-sensing device using the SOI structure. One example of making such an SOI structure is a laser recrystallizing technique in which an amorphous silicon layer formed on an insulating film is irradiated with laser light so that it is melted and re-solidified (Unexamined Japanese Patent Publication No. 6-112121). The laser recrystallizing technique has an advantage that a high-quality single-crystal film can be formed at a low cost using a manageable device, but has a disadvantage that a quasi grain boundary is formed within the single crystal.

FIGS. 15 to 18 are sectional views and a sectional perspective view for showing the conventional SOI structure in which single crystal silicon is formed on an insulating film by a laser recrystallization technique and its fabricating method. In FIG. 15, after an insulating layer 2 having openings 4 and made of $SiO_2$ is formed on a single-crystal silicon (Si) substrate 1, a polycrystalline Si (poly-Si) layer 3 is formed on the surface of the insulating layer 2 and within the openings 4. It should be noted that the poly-Si within the opening 4 can be a seed crystal region. On the surface of the poly-Si layer 3, at positions spaced from the openings by substantially equal distance, anti-reflective films 5 made of silicon nitride are formed. Thereafter, as shown in FIG. 16, the entire surface is heated by irradiation with laser light 6. Now, the reflection factor for laser light (e.g., substantially 0%) of the portions where the anti-reflective films 5 are present on the surface of the poly-Si layer 3 is significantly lower than that (e.g. about 40%) of the remaining portions where Si is exposed. The poly-Si layer underlying the anti-reflective films 5, therefore, absorbs more laser light and hence is heated to a higher temperature. In other words, the poly-Si within the openings 4 where the anti-reflective films 5 are not formed is maintained at a comparatively low temperature.

The poly-Si layer 3 melted by irradiation with laser light, cools after laser irradiation is ended and, is recrystallized. In this case, as shown in FIG. 17, recrystallization of the molten poly-Si layer 3 is started from the portions with a lower temperature. The poly-Si layer within the openings 4 is first recrystallized. The recrystallized single crystal within the openings 4 resulting from the recrystallization serve as seed portions 41. Recrystallization of the poly-Si layer 3 is started from the seed portions 41. Of the molten poly-Si layer 3, reference numeral 32 denotes one of a plurality of recrystallized portions, 31 denotes one of a plurality of portions in a molten state, and 33 denotes one of a plurality of boundaries between the recrystallized portions 32 and the molten portions.

In this way, recrystallization of the poly-Si layer 3 is carried out. Recrystallization is started from the seed portions and advances towards the lower portions of the anti-reflective films 5 maintained at a higher temperature. Thus, the crystals grown from both sides toward a center portion below each of the anti-reflective films 5 collide with each other. As shown in the sectional perspective view of FIG. 18, a quasi grain boundary 7 sometimes called a subgrain boundary, is generated at each of colliding portions. These quasi grain boundaries contain many crystal defects (not shown) which trap carriers (electrons or holes) and constitute potential barriers. The potential barriers tend to increase as the impurity concentration in the crystal becomes lower.

FIG. 19 is a sectional view showing the structure of a conventional semiconductor pressure-sensing device using the SOI structure thus formed as a pressure-sensing resistor. FIG. 20 is a partial top view showing the part of the pressure-sensing resistor of the conventional semiconductor pressure-sensing device. In FIGS. 19 and 20, reference numeral 30 denotes a pressure-sensing resistor in the conventional SOI structure containing quasi grain boundaries 7. Reference numeral 8 denotes an inter-layer insulating film; 9 denotes a wiring layer connected to the pressure-sensing resistor 30; 10 denotes a protection film covering the inter-layer insulating film and the wiring layer; and 11 denotes a diaphragm at the back surface of a silicon (Si) substrate.

The conventional SOI structure formed through the fabrication process described above contains quasi grain boundaries. It is well known that the piezo resistance effect increases with a decrease in the impurity concentration of single crystal Si. In the case of recrystallized Si containing quasi grain boundaries, as described above, as the impurity concentration decreases, the potential barrier generated in the quasi grain boundaries becomes high. The potential barrier also increases with the crystal defect density at the quasi grain boundary. Since the crystal defect density itself varies in a wafer, with the impurity concentration reduced, the piezo resistance effect is greatly influenced by variation in the potential barrier, thus giving rise to a non-uniformity in the resistance of the pressure-sensing resistor within a wafer. Thus, when the impurity concentration is lowered to provide and SOI structure having large piezo resistance effect, the unevenness in the resistance in the SOI structure within the same wafer increases. Inversely, when the impurity concentration is increased to suppress the non-uniformity in the resistance, a sufficient piezo resistance effect cannot be obtained.

In a semiconductor pressure-sensing device using the SOI structure as a pressure-sensing resistor, it is necessary to compensate for the temperature of an output in accordance with the operating temperature. In order to compensate for temperature variations with great accuracy, it is necessary to control the resistance of a pressure-sensing resistor and the resistor temperature characteristic with great accuracy.

However, where the conventional SOI structure containing quasi grain boundaries was used as a pressure-sensing resistor of a semiconductor pressure-sensing device, the resistance of the pressure-sensing resistor varies for each device so that it was difficult to compensate for the temperature with great accuracy.

An exemplary method of solving such a problem is to form pressure-sensing resistor 35 at a region void of the quasi grain boundaries 7 on the surface of a Si layer 32 formed by recrystallization as shown in the sectional perspective view of FIG. 21 (JP-A 6-112121). Although this method can reduce non-uniformities in the resistance of the pressure-sensing resistor 35, the pressure-sensing resistor 35 must be spaced from the quasi grain boundaries 7. This provides a limitation on the size, shape, and location of the pressure-sensing resistor 35 and is an obstacle of designing a device.

SUMMARY OF THE INVENTION

The present invention has been accomplished in order to solve the above problem, and provides an SOI structure with reduced non-uniformities in the resistance due to quasi grain boundaries without reducing the piezo resistance effect and limiting device designing, its fabricating method and a semiconductor pressure sensing device which can compensate for temperature with great accuracy with little variation in the resistance of a pressure-sensing resistor.

The SOI structure according to the invention comprises a single-crystal semiconductor substrate, an insulating layer on the single-crystal semiconductor substrate, a single-crystal semiconductor layer on the insulating layer and having a quasi grain boundary, and a highly doped region having a higher impurity concentration than that of the remaining portion located in a portion including the quasi grain boundary in the single-crystal semiconductor layer.

In the SOI structure according to the invention, the impurity concentration of the high impurity concentration area in the single-crystal semiconductor layer is not lower than $4\times10^{17} cm^{-3}$.

A method of fabricating an SOI structure according to the present invention comprises the steps of: forming an insulating layer having an opening on a single-crystal semiconductor substrate; forming a poly-crystal semiconductor layer on the insulating layer and within the opening of the insulating layer; partially forming an anti-reflective film at positions spaced from the opening of the insulating layer by a substantially uniform distance on the surface of the insulating layer; melting the poly-crystal semiconductor layer by laser irradiation and cooling to form a single crystal; and selectively implanting impurities into the portion including the quasi grain boundary of the single-crystallized semiconductor layer.

Another method of fabricating an SOI structure according to the invention comprises the steps of: forming an insulating layer having an opening on a single-crystal semiconductor substrate; forming a poly-crystal semiconductor layer on the insulating layer and within the opening of the insulating layer; forming a reflective film having an opening at a position corresponding to the upper portion of the opening of the insulating layer on the surface of the insulating film; melting the poly-crystal semiconductor layer by laser irradiation and cooling to form a single crystal; and selectively implanting impurities into the portion including a quasi grain boundary of the single-crystallized semiconductor layer using the reflective film as a mask.

A semiconductor pressure-sensing device of the present invention uses, as a pressure-sensing resistor, an SOI structure comprising a single-crystal semiconductor substrate, an insulating layer on the single-crystal semiconductor substrate, and a single-crystal semiconductor layer on the insulating layer and having a quasi grain boundary, wherein a highly doped region having a higher impurity concentration than that of the remaining portion is located in a portion including the quasi grain boundary in the single-crystal semiconductor layer.

In the SOI structure according to the present invention, highly doped regions whose impurity concentration is higher than that of the remaining regions of the recrystallized single crystal semiconductor layer are formed at portions including quasi grain boundaries. Therefore, unevenness of the resistance is suppressed without reducing the piezo resistance effect of the SOI structure. This advantage can be assured by setting the impurity concentration of the region not lower than $4\times10^{17} cm^{-3}$.

The method of fabricating the SOI structure according to the present invention comprises a step of selectively implanting impurities into portions including quasi grain boundaries of the recrystallized single-crystal semiconductor layer. The SOI structure of the present invention can be provided by a more simple fabricating process.

The other method of fabricating the SOI structure according to the present invention, which uses a reflective film as a selective mask for ion-implantation, does not require formation of a photoresist so that the quasi grain boundaries are located at the openings, thus providing an advantage of completing the SOI structure by a simpler fabricating process.

In the semiconductor pressure-sensing device according to the present invention, a pressure-sensing resistor has an SOI structure with highly doped regions having an impurity concentration higher than that of the remaining regions of the recrystallized single crystal semiconductor layer located at portions including a quasi grain boundaries, and provide an advantage of temperature compensation with great accuracy.

DETAILED DESCRIPTION OF PREFERRED EMBODIMENTS

Embodiment 1

Figure 3:
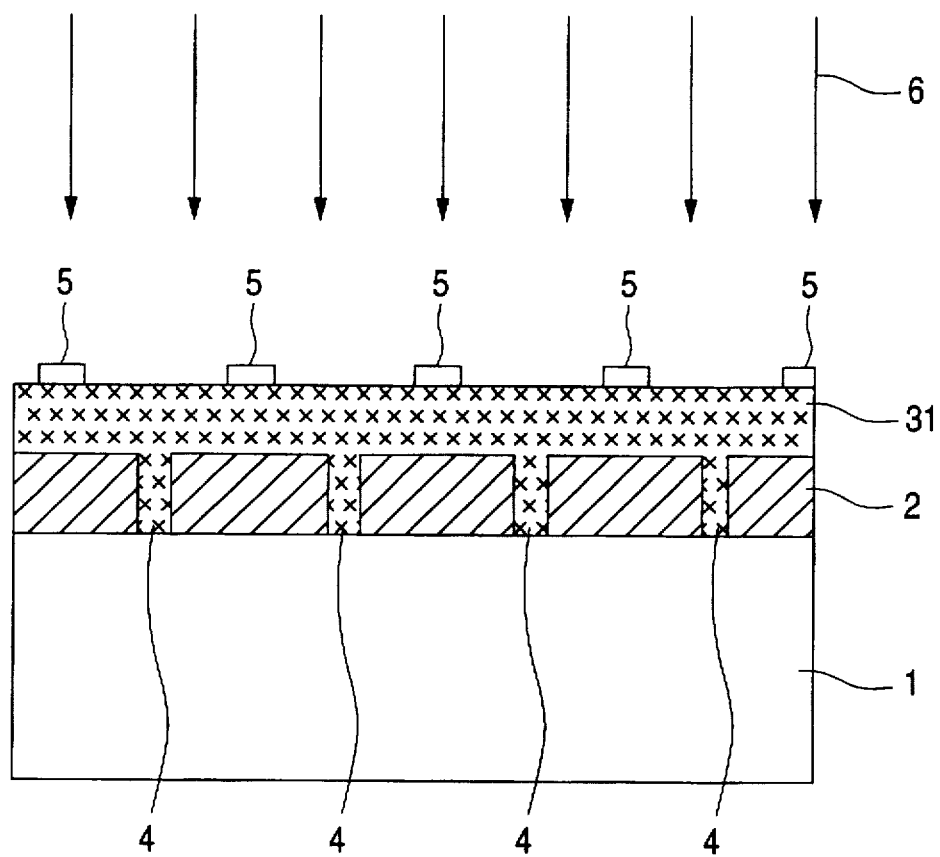

An explanation will be given of an SOI structure and its fabricating method which are the first embodiment of the present invention. First, referring to sectional views and a sectional perspective view of FIGS. 2 to 7, an explanation will be given of a method of fabricating an SOI structure. It should be noted that the process illustrated in FIGS. 2 to 5 is the same as the process of fabricating the conventional SOI structure. Specifically, in FIG. 2, after an insulating layer 2 having openings 4 and made of $SiO_2$ is formed on a single-crystal silicon (Si) substrate 1, a polycrystalline Si (poly-Si) layer 3 is formed on the surface of the insulating layer 2 and within the openings 4. It should be noted that poly-Si within the openings 4 can be a seed crystal region. On the surface of the poly-Si layer 3, at positions spaced from each of the openings 4 by a substantially equal distance, anti-reflective films 5 made of a silicon nitride film are formed. Thereafter, as shown in FIG. 3, the entire surface is irradiated with laser light 6. Now, the reflection factor for laser light (e.g., substantially zero) of the portions where the anti-reflective films 5 are located on the surface of the poly-Si layer 3 is much lower than that (e.g. about 40%) of the remaining portions where Si is exposed. The poly-Si layer underlying the anti-reflective films 5, therefore, sufficiently absorbs laser light and hence is heated to a higher temperature. In other words, the poly-Si within the openings 4 where the anti-reflective films 5 are not present are maintained at a comparatively low temperature.

Figure 4:
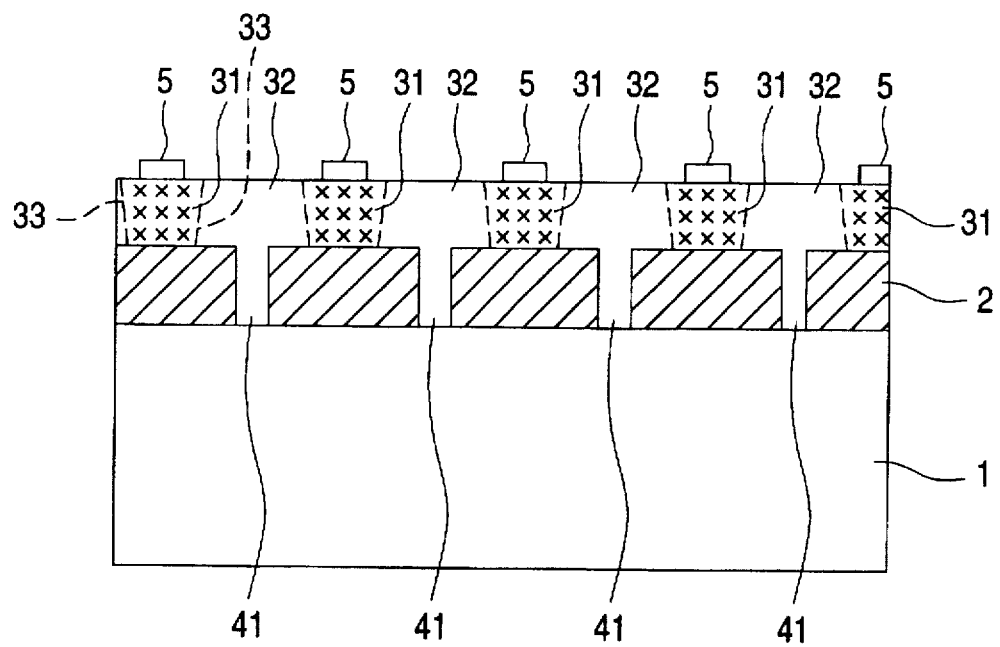
Figure 5:
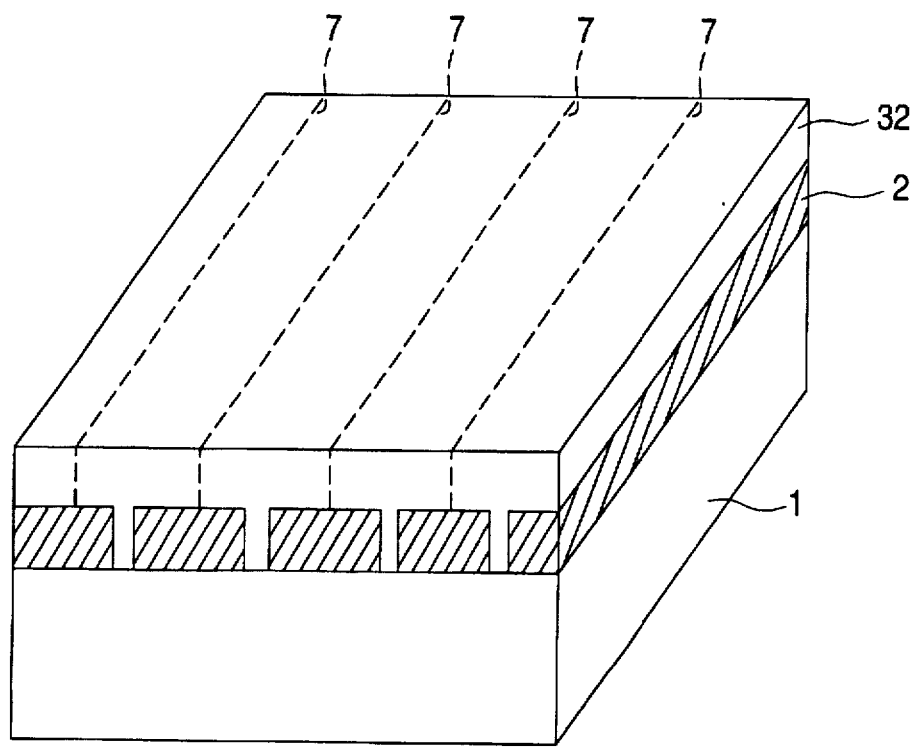

The poly-Si layer 31 melted by irradiation with laser light, which cools after laser irradiation is ended, is recrystallized. In this case, as shown in FIG. 4, recrystallization of the molten poly-Si layer 3 is started from the portions with a lower temperature. The poly-Si layer within the openings 4 is first recrystallized. The recrystallized single crystal within the openings 4 resulting from the recrystallization serve as seed portions 41. Recrystallization of the poly-Si layer 3 is started from the seed portions 41. Of the molten poly-Si layer 3 in FIG. 4, reference numeral 32 denotes one of a plurality of recrystallized portions, 31 denotes one of a plurality of portions in a molten state, and 33 denotes one of a plurality of boundaries between the recrystallized portions 32 and the molten portions 31.

Figure 18:
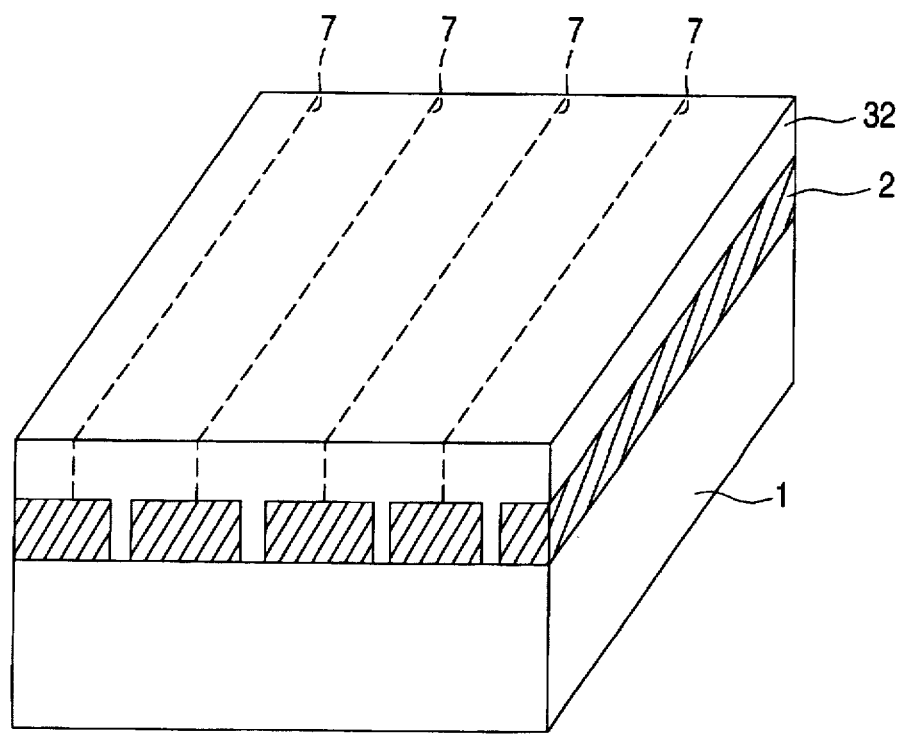
FIG. 18 is a sectional perspective view showing a conventional SOI structure.
Figure 19:
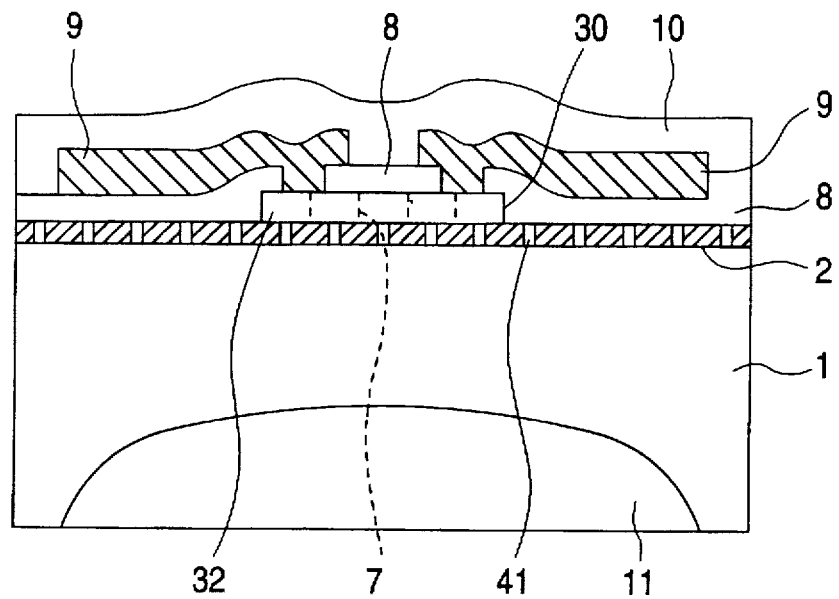
FIG. 19 is a sectional view showing a conventional semiconductor pressure-sensing device.
Figure 20:
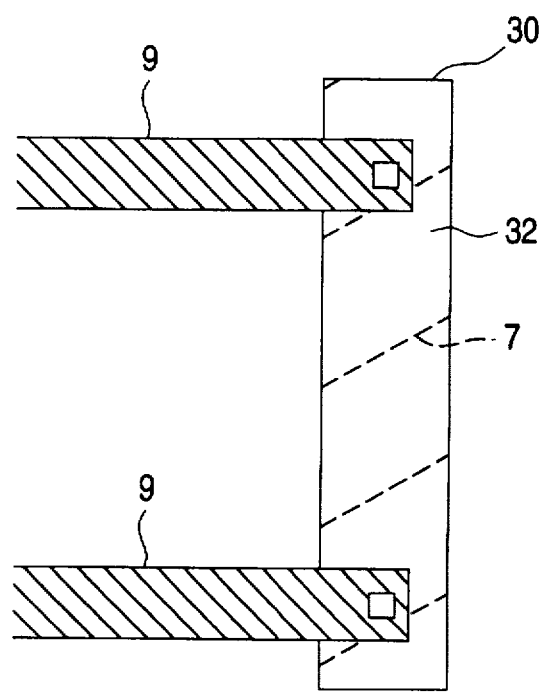
FIG. 20 is a plan view showing a conventional semiconductor pressure-sensing structure.
Figure 21:
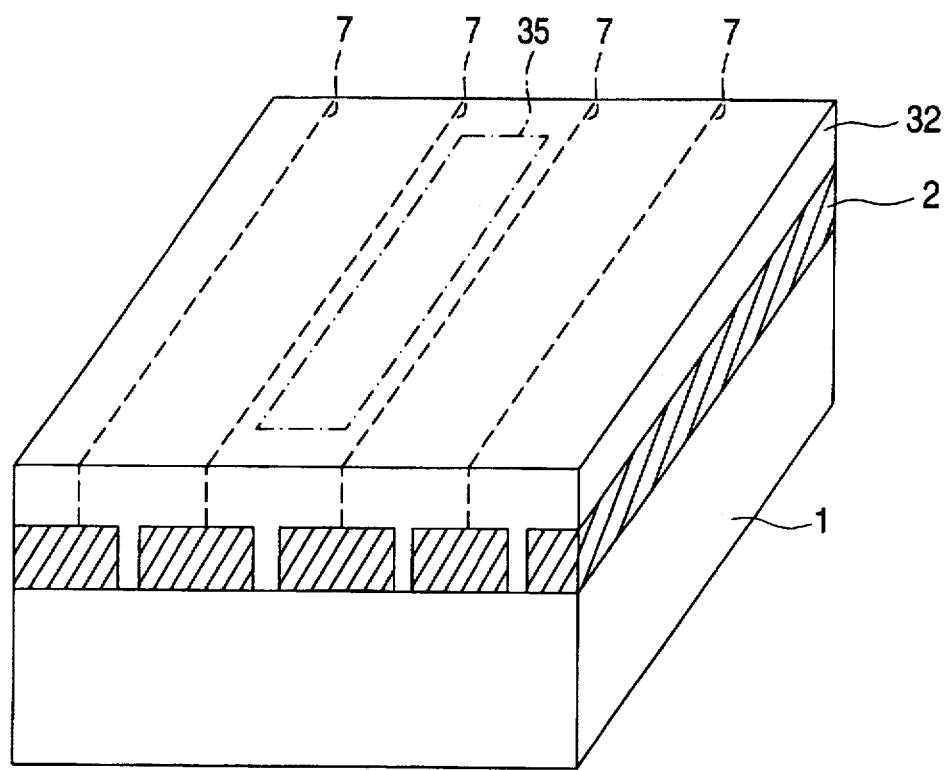
FIG. 21 is a sectional perspective view showing another conventional SOI structure.

In this way, recrystallization of the poly-Si layer 3 is carried out. Recrystallization is started from the seed portions and advances towards the lower portions of the anti-reflective films 5 that remain at a higher temperature. Thus, the crystals grown from both sides toward a center portion of the lower portion of each of the anti-reflective films 5 collide with each other. As shown in the sectional perspective view of Fig. 18, a quasi grain boundary 7 is generated at each of the colliding portions. As described above, the process described hitherto is the same as the process of the conventional SOI structure.

Figure 6:
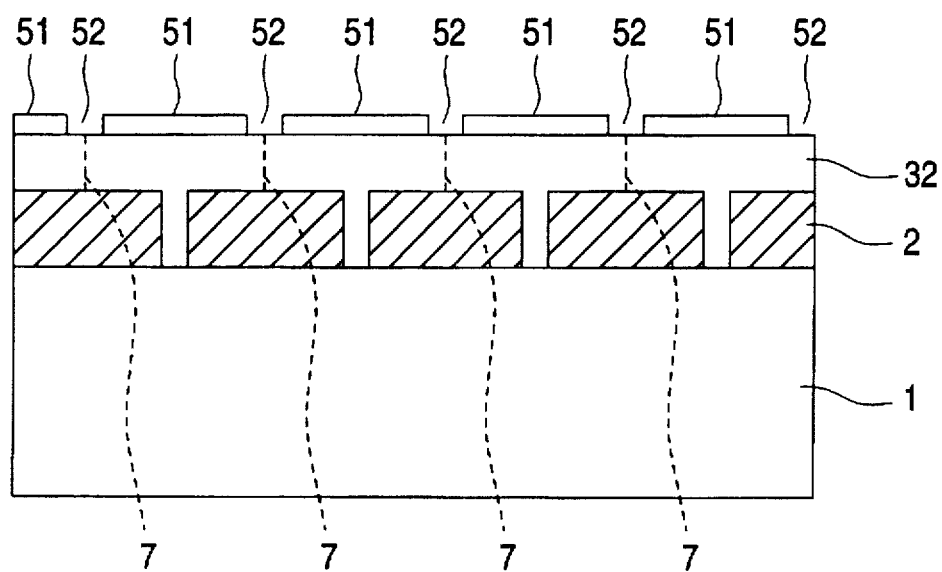
Figure 7:
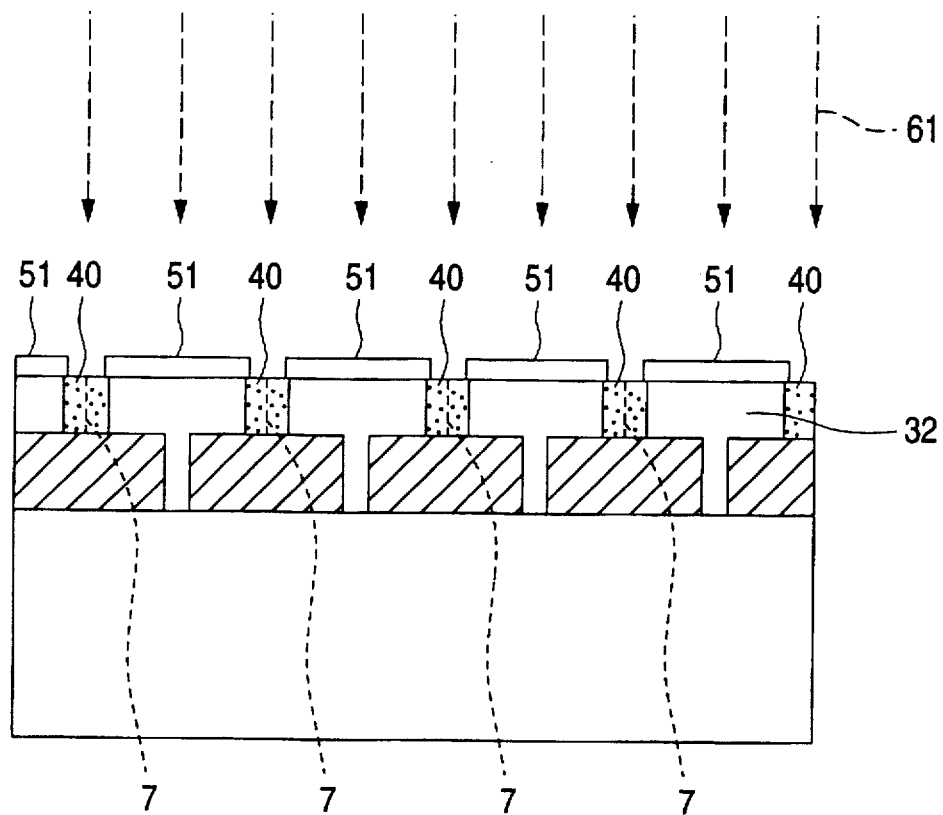

As seen from FIG. 6, on the surface of the recrystallized Si layer 32, a photoresist 51 having openings where quasi grain boundaries 52 are located is formed. As seen from FIG. 7, using the photoresist 51 as a mask, ions are implanted into the portions of the quasi grain boundaries 7 of the recrystallized Si layer 32 to form highly doped regions 40 having an impurity concentration higher than that of surrounding regions. The recrystallized Si 32, where it is n-type and has an impurity concentration of $1 \times 10^{17}$ cm$^{-3}$ or so, is ion-implanted with, e.g., B$^+$by irradiation with ion beams 61 so that the impurity concentration of the highly doped impurity regions 40 is $4 \times 10^{17}$cm$^{-3}$. The photoresist 51 is removed, and annealing is carried out to activate the impurities of the highly doped regions 40.

Figure 1:
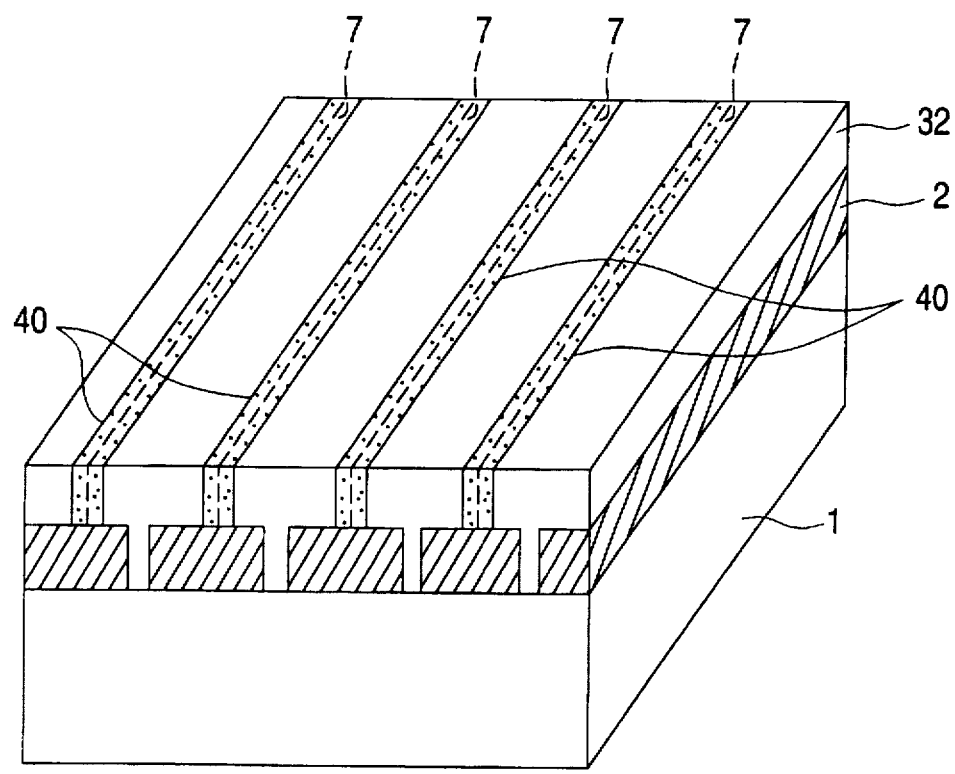
FIG. 1 is a sectional perspective view showing the SOI structure according to the first embodiment of the present invention.
Figure 2:
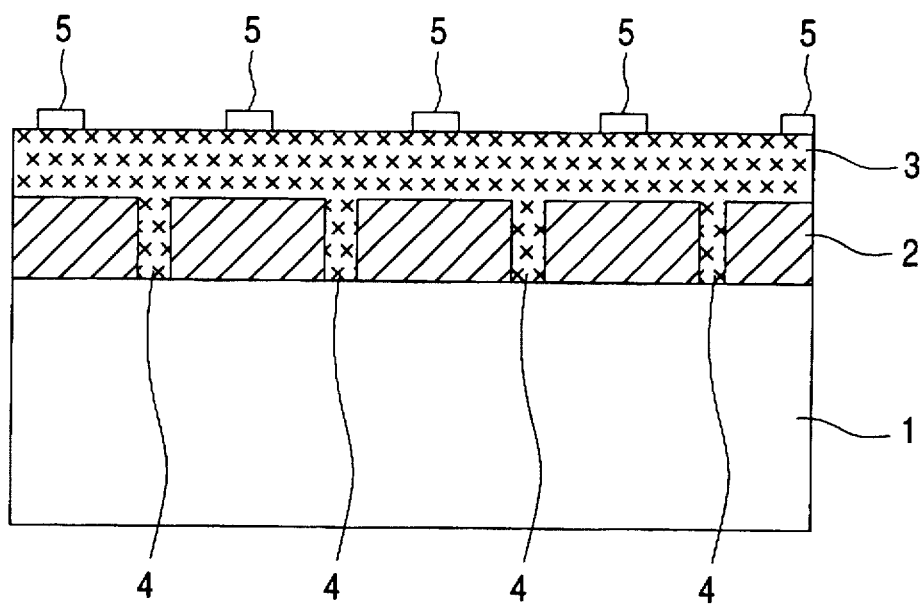
FIGS. 2 to 7 are sectional views showing the method of fabricating the SOI structure according to the first embodiment of the present invention.

The sectional perspective view of the SOI structure thus formed is shown in FIG. 1. In such an SOI structure, the impurity concentration of the highly doped regions 40, each including a quasi grain boundary 7 of the recrystallized Si layer 32, is higher than that of the surrounding regions. As described previously, since the height of the potential barrier is inversely proportional to the impurity concentration, the height of the potential barrier generated at the quasi grain boundary 7 becomes higher than when the highly doped regions 40 are not formed. Thus, non-uniformity in the resistance in the SOI structure due to variations in the height of the potential barrier can be reduced. On the other hand, because the impurity concentration of the highly doped regions are enhanced, the piezo resistance effect in these regions is lowered. However, since the ratio of the highly doped regions 40 to the remaining regions in the recrystallized Si layer 32 is small (e.g. 1/20), the reduction in the piezo resistance effect in the entire SOI structure is also small. Accordingly, in the SOI structure according to this embodiment, non-uniformity in the resistance can be suppressed without reducing the piezo resistance effect.

The reason why the impurity concentration of the highly doped regions 40 is set to $4 \times 10^{17}$cm$^{-3}$ is based on the experiential fact that the yield of the semiconductor pressure-sensing device when the above SOI structure is used as a pressure-sensing resistor is greatly improved at that impurity concentration or higher.

Embodiment 2

Figure 8:
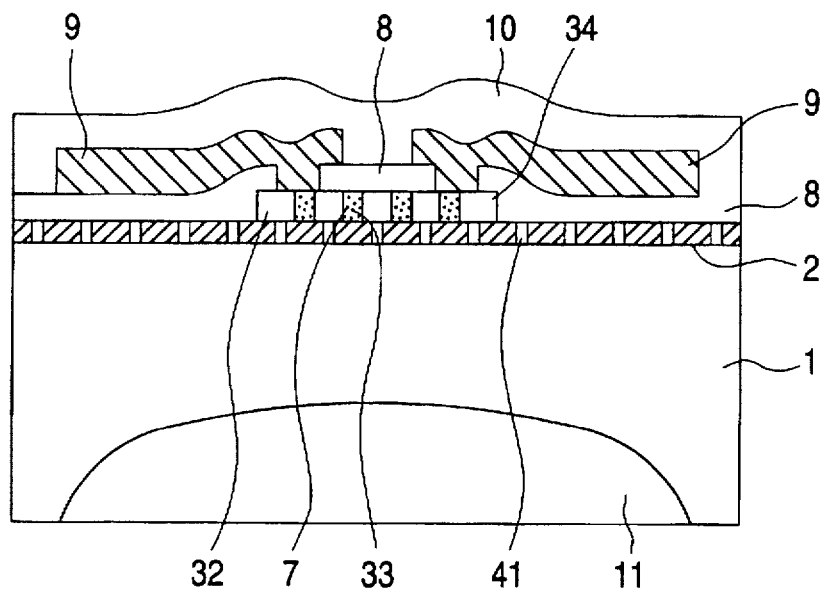
FIGS. 8 and 9 are sectional views showing a semiconductor pressure-sensing device according to the second embodiment of the present invention.
Figure 9:
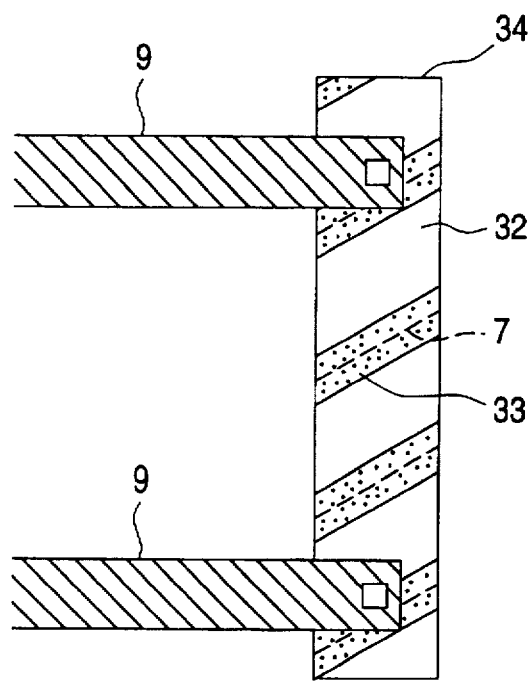
Figure 10:
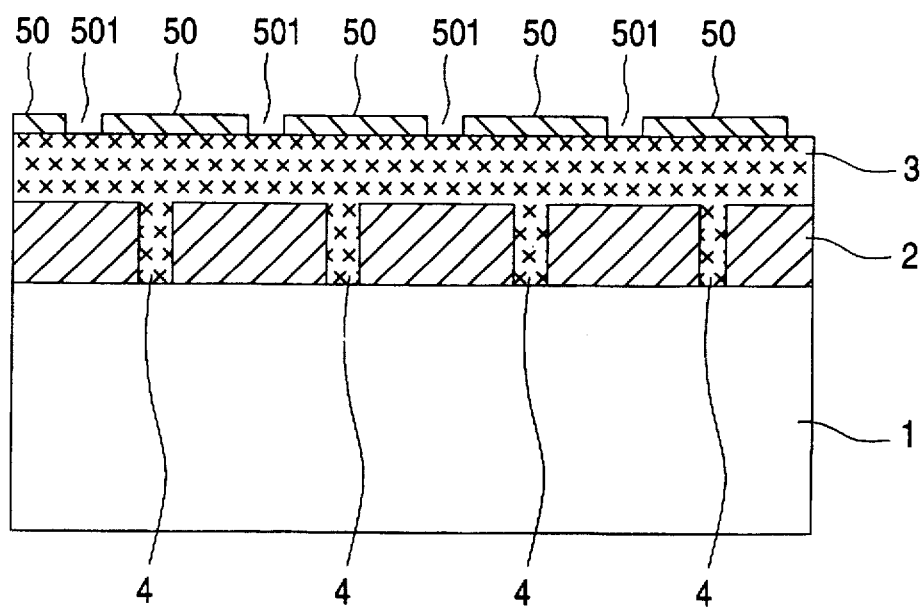
FIGS. 10 to 14 are sectional views showing the method of fabricating the SOI structure according to the third embodiment of the present invention.

Now referring to FIGS. 8 and 9, an explanation will be given of the structure of a semiconductor pressure-sensing device which is a second embodiment of the present invention. FIG. 8 is a sectional view showing the structure of a semiconductor pressure-sensing device in which the SOI structure according to the first embodiment of the present invention is used as a pressure-sensing resistor 34. FIG. 9 is a partial top view showing the structure of the part of a pressure-sensing resistor 34 of the semiconductor pressure-sensing device. In FIGS. 8 and 9, the structure, other than the pressure-sensing resistor 34, is the same as that of the conventional semiconductor pressure-sensing device. Specifically, reference numeral 8 denotes an inter-layer insulating film 8; 9 denotes wiring layer electrically connected to the pressure-sensing resistor; 10 denotes a protection film covering the inter-layer insulating film 8 denotes and wiring layer 9; and 11 a diaphragm formed on the back surface of the Si substrate. If the SOI structure according to the first embodiment of the present invention is used as a pressure-sensing resistor of the semiconductor pressure-sensing device, as described above, a pressure-sensing resistor having little variation in the resistance value can be formed without reducing the piezo resistance effect. Thus, a semiconductor pressure-sensing device with temperature compensation having great accuracy can be obtained.

Embodiment 3

Referring to the sectional views of FIGS. 10 to 14, an explanation will be given of a method of fabricating the SOI structure.

Figure 11:
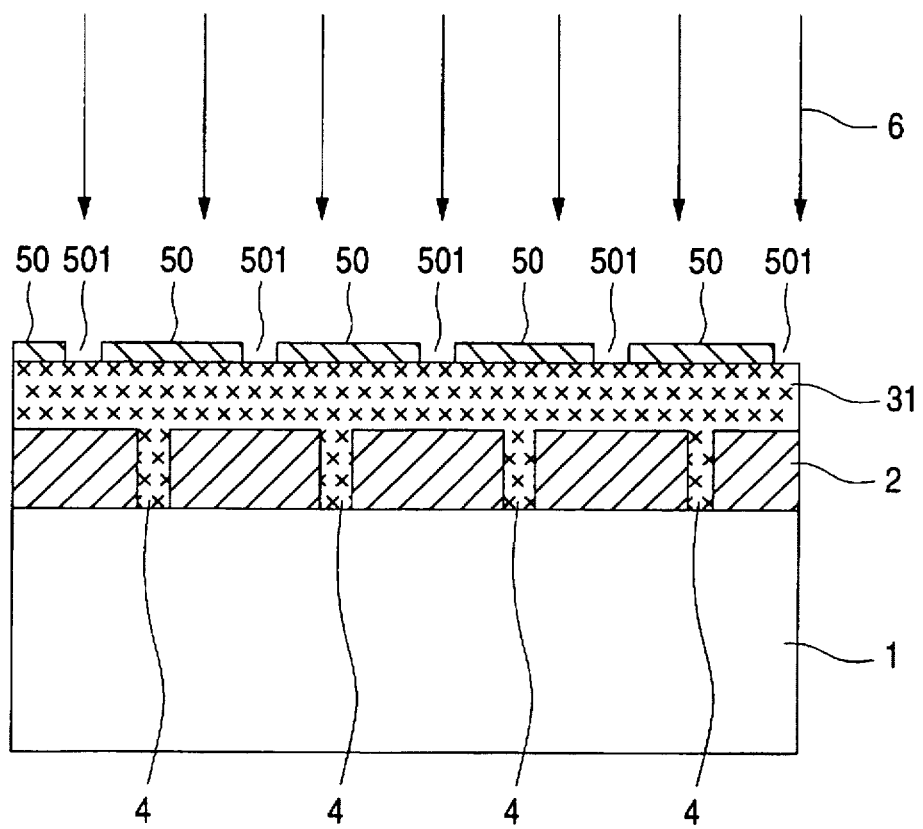

An explanation will be given of an SOI structure and a fabricating method according to the first embodiment of the present invention. Specifically, in FIG. 10, after an insulating layer 2 having openings 4 and made of $SiO_2$ is formed on a single-crystal silicon (Si) substrate 1, a polycrystalline Si (poly-Si) layer 3 is formed on the surface of the insulating layer 2 and within the openings 4. It should be noted that poly-Si within the opening 4 can be a seed crystal region. On the surface of the poly-Si layer 3, at positions spaced from the openings by substantially equal distances, reflective films 50 made of a silicon nitride film are formed. Thereafter, as shown in FIG. 11, the entire surface is irradiated with laser light 6. Now, the reflection factor for laser light (e.g., 90%) of the portions where the reflective films 50 are formed on the surface of the poly-Si layer 3 is significantly higher than that (e.g. about 40%) of the remaining portions void of the reflective films at openings 501. The poly-Si layer underlying the openings 501, therefore, absorbs significantly laser light than the poly-Si layer underlying the reflective films 50 and hence is heated to a higher temperature. In other words, the poly-Si underlying the reflective films 50 of maintained at a comparatively low temperature.

Figure 12:
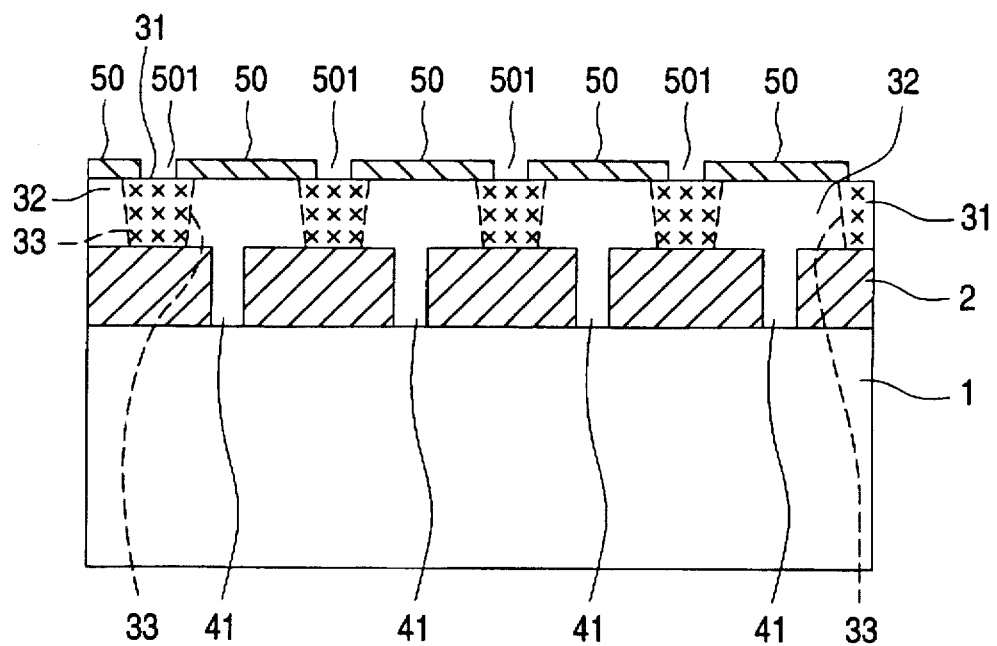

The poly-Si layer 31 melted by irradiation with laser light, cools after laser irradiation is ended and, is recrystallized. In this case, as shown in FIG. 12, recrystallization of the molten poly-Si layer 3 starts from the portions with a lower temperature. The poly-Si layer within the openings 4 is first recrystallized. The recrystallized single crystal within the openings 4 resulting from the recrystallization serve as seed portions 41. Recrystallization of the poly-Si layer 3 starts from the seed portions 41. In the molten poly-Si layer 3 in FIG. 12, reference numeral 32 denotes one of a plurality of recrystallized portions, 31 denotes one of a plurality of portions in a molten state, and 33 denotes one of a plurality of boundaries between the recrystallized portions 32 and the molten portions.

Figure 13:
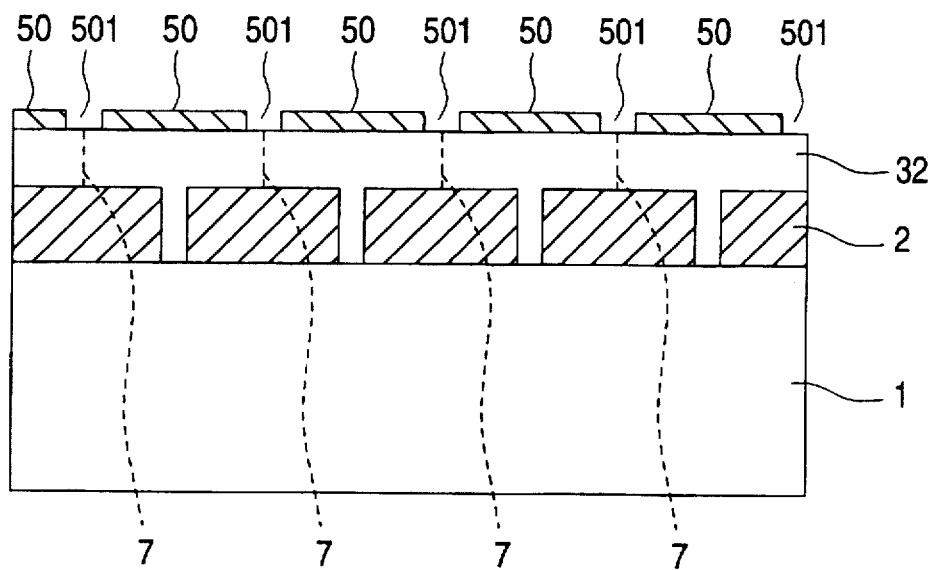

In this way, recrystallization of the poly-Si layer 3 is carried out. Recrystallization is started from the seed portions 41 and advances towards the lower portions of the openings 501 between the reflective films 5, remains at a higher temperature. Thus, the crystals grown from both sides toward a center portion opposite each of openings 501 collide with each other. As shown in FIG. 13, a quasi grain boundary 7 is generated at each of the colliding portions.

Figure 14:
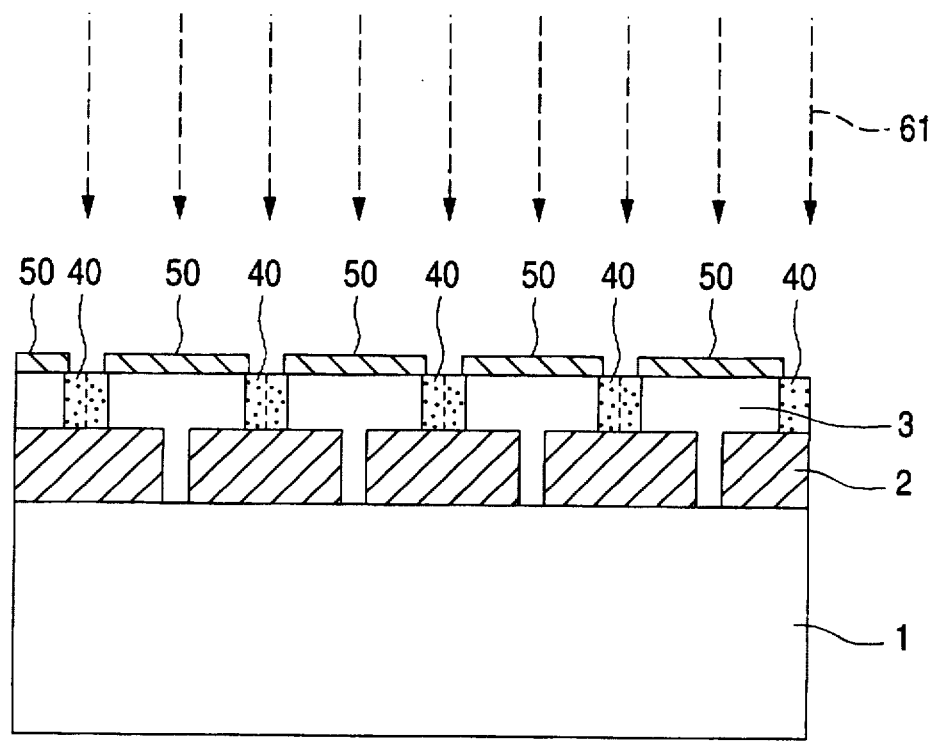
Figure 15:
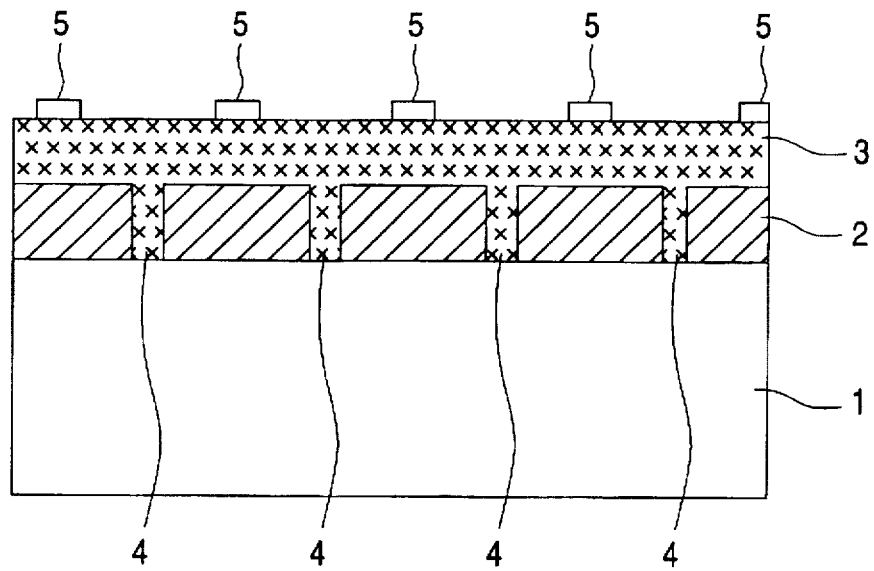
FIG. 15 is a sectional view showing a conventional SOI structure.
Figure 16:
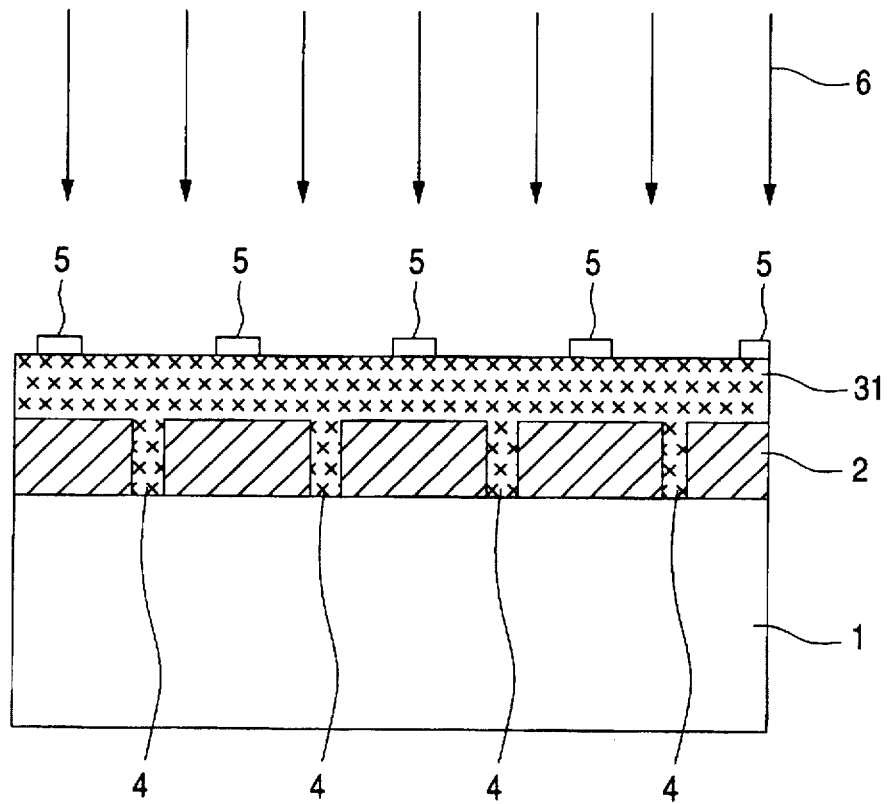
FIGS. 16 and 17 are sectional views showing the method of fabricating a conventional SOI structure.
Figure 17:
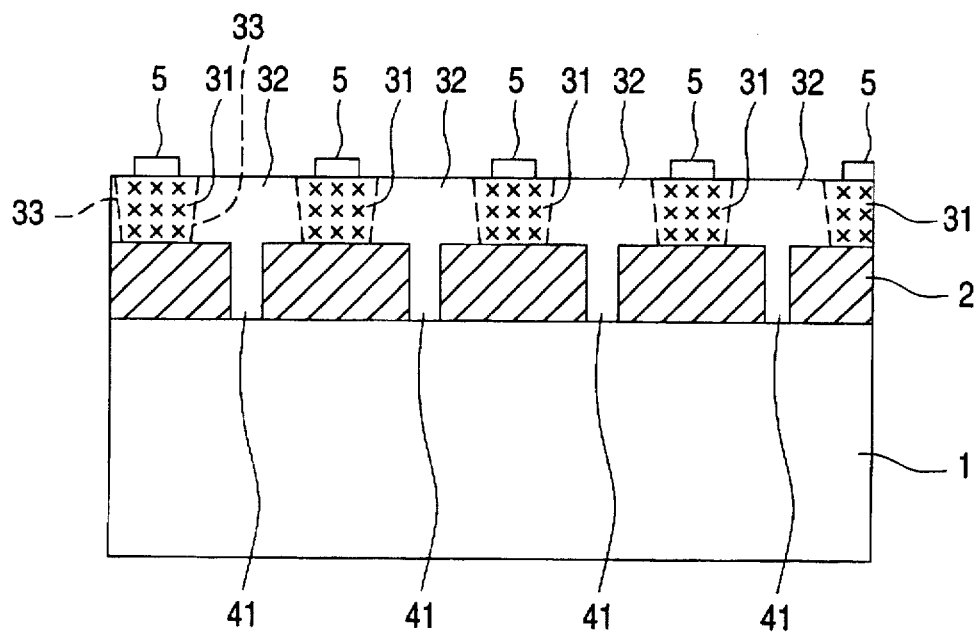

As seen from FIG. 14, using the reflective film as a mask, ions are implanted into the portions of the quasi grain boundaries 7 of the recrystallized Si layer 32 to form highly doped regions 40 with an impurity concentration higher than that of surrounding regions. The recrystallized Si 32, where it has an n conductivity type and an impurity concentration of $1\times10^{17}$ cm$^{-3}$ or so, is ion-implanted with, e.g., B$^+$ion by irradiation with ion beams 61 so that the impurity concentration of the highly doped impurity regions 40 is $4\times10^{17}$cm$^{-}$3. The reflective films are removed, and annealing is carried out to activate the impurities of the highly doped regions 40.

As described above, the method of fabricating an SOI structure according to the third embodiment is similar to that according to the first embodiment in that the SOI structure with the non-uniformity of resistance suppressed, without reducing the piezo resistance effect, can be obtained by forming the highly doped regions including the quasi grain boundaries 7. However, in the method of fabricating the SOI structure according to the third embodiment, since the reflective films 50 are also used as a mask for ion implantation, unlike the first embodiment, it is not necessary to form the photoresist 51 so that the grain quasi grain boundaries 7 are located at the openings 52. This embodiment permits the same SOI structure as that according to the first embodiment to be completed in a simpler fabrication process.

Further, the semiconductor pressure-sensing device in the SOI structure formed by the fabricating method according to the third embodiment is used as a pressure-sensing resistor and has the same advantage as described in connection with the second embodiment.

As described above, in the third embodiment according to the present invention, although the laser light 6 was used as means for heating and melting the Si layer 3, electron beams may be used instead of the laser light to fabricate an SOI structure according to the present invention. Further, although ion-implantation was carried out using the mask 51 or 50 to form the highly doped regions 40, focused ion beams (FIB) may be used to form the same SOI structure without using the mask. The highly doped regions 40 can also be formed by impurity diffusion. In the first embodiment, although the photoresist was used as a mask for selective ion-implantation to form the highly doped regions 40, an insulating film made of, e.g., $SiO_2$, or a poly-Si film may be used as a mask. In the embodiments described above, a silicon nitride film was used as a material of the anti-reflective film 5 and the reflective film 50, other materials, such as silicon oxide, may be used.

What is claimed is:

1. A method of fabricating a silicon-insulator-on-insulator structure comprising:

forming an insulating layer having an opening on a single crystal semiconductor substrate;

forming a polycrystalline semiconductor layer on said insulating layer and within the opening in said insulating layer;

forming an anti-reflective film at spaced apart positions on said polycrystalline semiconductor layer spaced from the opening in said insulating layer by a substantially uniform distance;

melting said polycrystalline semiconductor layer by laser irradiation and recrystallizing said poly-crystalline semiconductor layer into a single crystal layer including a quasi grain boundary; and selectively implanting dopant impurities into the portion of said single crystal layer including the quasi grain boundary.

2. A method of fabricating a silicon-on-insulator structure comprising:

forming an insulating layer having an opening on a single crystal semiconductor substrate;

forming a polycrystalline semiconductor layer on said insulating layer and within the opening in said insulating layer;

forming a reflective film on said polycrystalline semiconductor layer and having an opening opposite the opening in said insulating layer;

melting said polycrystalline semiconductor layer by laser irradiation and recrystallizing said poly-crystalline semiconductor layer into a single crystal layer including a quasi grain boundary; and selectively implanting dopant impurities into the portion of said single crystal layer including the quasi grain boundary using said reflective film as an ion implantation mask.

* * * * *

UNITED STATES PATENT AND TRADEMARK OFFICE
CERTIFICATE OF CORRECTION

PATENT NO. : 5,776,818
DATED : July 7, 1998
INVENTOR(S) : YASUO YAMAGUCHI

It is certified that error appears in the above-identified patent and that said Letters Patent is hereby corrected as shown below:

Column 8, Line 21, change "silicon-insulator-on-insulator" to

--silicon-on-insulator--;

Line 33, change "poly-crystalline" to

--polycrystalline--;

Line 50, change "poly-crystalline" insert

--polycrystalline--;

Abstact, Line 5, delete "lating";

Line 10, change "semi-conductor" to --semiconductor--

Signed and Sealed this

Tenth Day of November 1998

Attest:

BRUCE LEHMAN

Attesting Officer

Commissioner of Patents and Trademarks